United States Patent [19]

Kawaguchi

[11] 4,217,004
[45] Aug. 12, 1980

[54] CONTROLLING MEANS FOR A DUAL VEHICLE HYDRAULIC BRAKING SYSTEM

[75] Inventor: Hiroshi Kawaguchi, Mishima, Japan

[73] Assignee: Toyota Jidosha Kogyo Kabushiki Kaisha, Aichi, Japan

[21] Appl. No.: 883,854

[22] Filed: Mar. 6, 1978

[30] Foreign Application Priority Data

Nov. 17, 1977 [JP] Japan .................................. 52-138333

[51] Int. Cl.³ .............................................. B60T 13/00
[52] U.S. Cl. .................................... 303/6 C; 188/349
[58] Field of Search ................... 188/151 A, 345, 349; 303/6 C

[56] References Cited

U.S. PATENT DOCUMENTS

| | | | |
|---|---|---|---|
| 3,525,552 | 8/1970 | Oberthur | 188/151 A X |
| 3,701,567 | 10/1972 | Shutt et al. | 188/349 X |
| 3,712,683 | 1/1973 | Keady et al. | 188/349 X |
| 3,804,468 | 4/1974 | Ishikawa et al. | 303/6 C |
| 3,976,334 | 8/1976 | Farr | 303/6 C |

FOREIGN PATENT DOCUMENTS 51-29432  7/1976  Japan .

Primary Examiner—George E. A. Halvosa
Attorney, Agent, or Firm—Browdy and Neimark

[57] ABSTRACT

A controlling device used in a dual hydraulic braking system of a vehicle including a master cylinder which produces hydraulic braking pressure in response to the pedal depression, wheel cylinders disposed on each wheel, two mutually independent circuits for delivering the braking pressure from the master cylinder to each wheel cylinder, and a regulating valve disposed at least in one circuit of the two for controlling the hydraulic braking pressure delivered to the wheel cylinder. The controlling device is characterized in possession of an operation restricting mechanism, wherein a second piston, disposed substantially perpendicularly to a first piston in the regulating valve, is exposed to air on one end thereof, and affected by the hydraulic pressure on the other end thereof from a circuit which is not under control of the regulating valve, and is constantly biased by a compression spring toward the pressure receiving side thereof to block the reciprocal movement of the first piston, exceptionally allowing the first piston to reciprocate only when the hydraulic pressure acting on the second piston exceeds a certain predetermined value to overcome the spring force to shift the second piston toward the air-exposed end.

7 Claims, 3 Drawing Figures

CONTROLLING MEANS FOR A DUAL VEHICLE HYDRAULIC BRAKING SYSTEM

BACKGROUND OF THE INVENTION

This invention relates to a controlling means or assembly in a dual hydraulic brake system chiefly used in automotive vehicles, more particularly, to one wherein at least one circuit of the dual hydraulic brake system is provided with a hydraulic pressure controlling valve (hereinafter called a control valve).

In recent days, the automotive brake, hydraulically controlled one, is, for seeking a safer and surer braking effect in the midst of ever speed-increasing and worsening traffic conditions, taking a trend of separating the entire braking system into two mutually independent circuits, i.e., hydraulic circuits (hereinafter called circuit) connecting the master cylinder to each of the wheel cylinders disposed on the front and rear wheels. For example, a front brake circuit for the front wheel cylinders is independently separated, in one case, from a rear brake circuit for the rear wheel cylinders; in another case, a front wheel cylinder is involved with a diagonally apart rear wheel cylinder in an independent unit of circuit. All of these dual brake systems are mainly aimed at preventing failure of braking function, due to a trouble occurrence like an oil leakage, in all of wheels at a time, by completely separating the whole system into two circuits. In this type of dual braking system, a hydraulic control means (a regulating valve) is practically installed at least in one circuit of the two, for the purpose of attaining vehicle safety at the time of brake application, by means of dividing the braking power into two. In the previously mentioned system, separating the system into two circuits, i.e., one circuit to the front wheels and the other to the rear wheels, the hydraulic pressure generated in one of the two compressing chambers of the master cylinder, in response to the brake pedal depression, is delivered to the front wheel cylinders usually directly, and the pressure from the other compressing chamber of the master cylinder is indirectly delivered to the rear wheel cylinders, by means of inserting a regulating valve in the circuit, for the purpose of suitably adjusting the hydraulic pressure supplied to the rear wheel cylinders. On the rear wheel cylinders regulated hydraulic pressure is to be supplied for the sake of safety, not the direct and unregulated pressure. Specifically speaking, when the pressure delivered to the rear wheel cylinders should exceed by chance a predetermined value it is to be reduced smaller than the master-cylinder-producing pressure. This device, although ingenious to some extent, has been found still defective in that the braking power delivered in the rear wheel cylinders alone is, i.e. in case of a trouble occurrence in the circuit to the front wheels, insufficient for attaining a fully effective and safe braking of the vehicle.

For eliminating this disadvantage some other devices are proposed to be known, one of which is Jitsu-Ko-Sho-51 (1976)-29432 Japanese Utility Model, wherein when any trouble occurs in one circuit of the two a hydraulic control assembly, namely a regulating valve, disposed in the other circuit, is ineffectuated for fully actuating the very the other circuit to attain the desired increase of braking power. The technical concept of this proposition lies in providing a by-pass valve means, when a trouble happens in one circuit, for directly flowing the braking hydraulic fluid from the master cylinder, without passing through the regulating valve, to the wheel cylinders.

In this device the fluid can avoid the influence or adverse effects of the regulating valve, however, some innegligible side effects are unexpectedly observed, such as, extra increase of fluid amount for actuating the by-pass valve, complication of the structure incurring the increase of component parts for the by-pass valve, and further high precision required in the manufacturing of seals used therein.

Toyota Jidosha Kogyo Kabushiki Kaisha, the assignee of the present invention proposed before, on the other hand, still another device, which was patented by the U.S. Pat. No. 3,729,237 wherein an electrical detecting means sensing a remarkable pressure drop in one circuit actuates an electromagnetic restriction means to suspend the operation of the regulating valve. The patented invention further includes another proposition, in which the valve includes a first piston for regulating the braking fluid and a second piston, perpendicularly disposed to the first piston, for halting the movement of the first piston by a suitable shifting thereof. Although the proposition, which is provided with the second piston, has a great merit on one hand in minimizing the flow of the braking fluid caused by the shifting of the first piston, because this device is so constructed as to suspend the movement of the first piston by the second piston, it still can not be free from being faulty. Because of its inherent construction mode, wherein the operation of the second piston executed on the balance relation of the hydraulic pressure between the mutually independent two circuits, it is likely to invite a shortage of the braking fluid supplied to the circuit in normal condition, when one circuit happens to be damaged. It results in insufficiency of the braking fluid delivered to the desired wheel cylinders, because the braking fluid in the normal circuit must be employed for actuating the second piston in addition to its proper purpose. This is not a minor problem but a serious one for the vehicle braking system, because the total fluid amount employed therein is extremely small in itself; even a slight amount of loss or shortage of the fluid in the normal circuit is innegligible. In addition, when one circuit is in malfunction the other normal circuit is strongly desired to be able to fully raise its pressure, so the fluid shortage in the very circuit urgently required of its capacity-up must be said critical. It often leads to a short of pedal stroke, or a so-called bottomming phenomenon, a forced pedaling shortage hindered by the abutment of the pedal onto the car floor.

SUMMARY OF THE PRESENT INVENTION

The present invention was made with such a background, particularly as an improvement of the previously mentioned proposition made by the applicant itself, i.e., a mode of blocking the movement of the first piston in the regulating valve by the second piston.

A primary object of this invention is therefore to provide a controlling means, in a hydraulic brake system including at least in one hydraulic circuit a regulating valve, which is capable of, when one circuit is in malfunction, securely increasing the braking power in the remaining circuit alone to effectively brake or halt the car.

Another object of this invention is to provide a controlling means, in the abovementioned dual hydraulic brake system, which is capable of, when one circuit is in malfunction, minimizing the fluid loss or shortage in the other normal circuit, consequently allowing the maximun possible braking power therein by eliminating the pedal stroke shortage or the bottomming phenomenon.

Still another object of this invention is to provide a controlling means, incorporating a simply constructed mechanism in a regulating valve (for controlling the hydraulic fluid), which is capable of ineffectuating the valve itself and of eliminating various conventional problems innevitable to this type of means, such as in the number of component parts, processing labor units, process precision required, etc., which controlling means being at the same time capable of functioning well as a regulating valve and as a highly reliable controlling means effectively raise the hydraulic pressure of the other normal circuit in case of a failure in one circuit.

Other objects and advantages of this invention will be apparent from the studying of the detailed description and the appended claims with reference to the drawings.

The gist of this invention will be summarized as a conclusion as follows:

This invention is aimed at a provision of a controlling means, used in a dual hydraulic braking system including (a) a master cylinder generating hydraulic pressure in response to the pedal depression, (b) wheel cylinders respectively disposed on the front and rear wheels, (c) a pair of mutually independent circuits for connecting the master cylinder to the wheel cylinders, and (d) a regulating valve, disposed at least in one of the abovementioned two circuits, for regulating the delivery of the hydraulic pressure from the master cylinder to the wheel cylinders, when the pressure becomes higher than a certain predetermined value. This controlling means is characterized in possessing a second piston which is placed substantially perpendicularly to a first piston which regulates the hydraulic pressure in the regulating valve, exposed to air at one end thereof, and affected by the pressure, at the other end thereof, in an opposite circuit from that including the regulating valve, and further constantly biased, by a compression spring, to the direction of the abovementioned other end, for blocking the movement of the first piston by means of an engagement with a part thereof, exceptionally allowing the first piston to operate when the pressure acting on the other end of the second piston exceeds a certain predetermined value.

DETAILED DESCRIPTION OF A PREFERRED EMBODIMENT

Detailed description of a preferred embodiment, with reference to the accompanying drawings will be stated hereunder.

Figure 1:
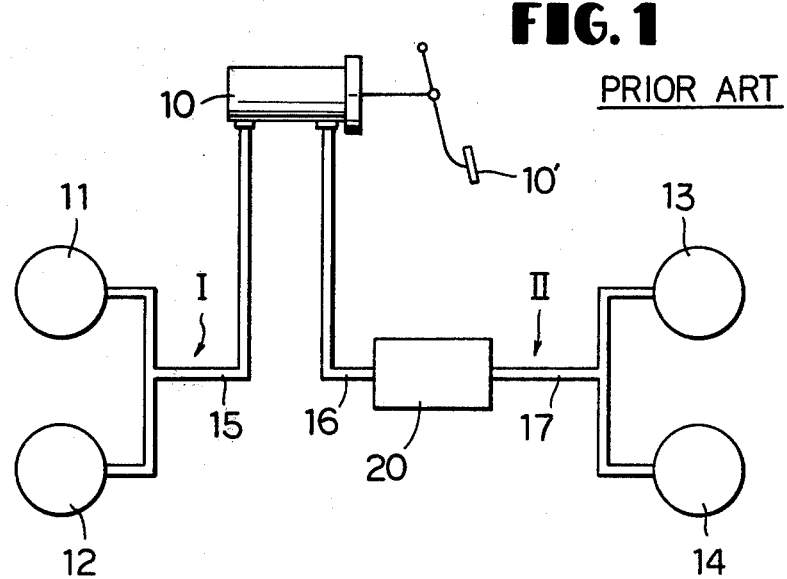
FIG. 1 is a typical diagram of circuit or piping which can be seen in a dual hydraulic braking system (prior art)

FIG. 1 shows a well-known skeleton diagram of the typical dual type hydraulic braking system, in which 10 is a master cylinder, composed of front and rear compressing chambers a front master cylinder and a rear master cylinder, for outputting hydraulically bidirectioned braking pressure by depressing of a pedal 10' into two circuits I and II, the former being connected through a piping 15 to front wheel cylinders 11, 12 disposed on the front wheels each and the latter being connected through pipings 16, 17 and the regulating valve 20 disposed in between to rear wheel cylinders 13, 14 on the rear wheels each. The braking power thus supplied to the wheel cylinders works as a source of actuation on drum brakes or disc brakes according to the type of cars. The whole brake system is, as above described, sharply divided into two circuits, which will herewith be allotted names circuit I for one including the piping 15 and the front wheel cylinders 11, 12, and circuit II for the other including the pipings 16, 17 and the regulating valve 20.

Figure 2:
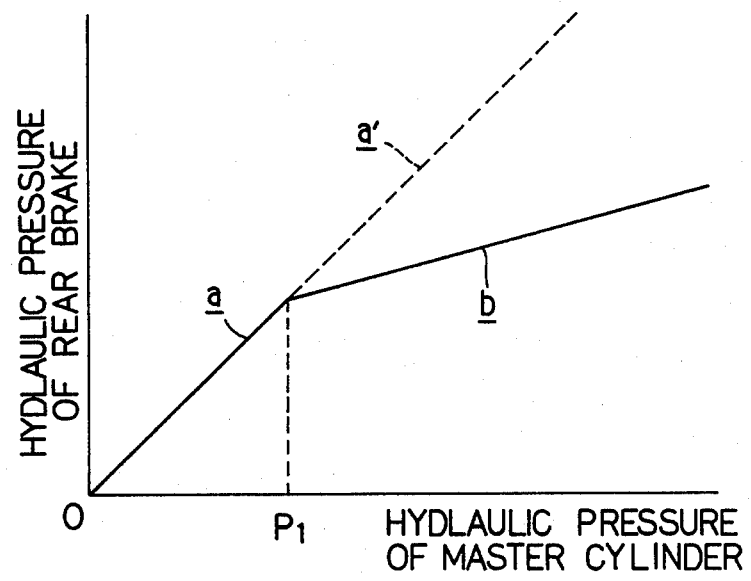
FIG. 2 is a graph of the characteristic feature of a hydraulic control assembly (regulating valve) which is to be installed in at least one of the circuits of the dual braking system.

In the case of employing a conventional proportioning valve as this regulating valve, its controlling feature or characteristic feature appears as a line shown in the graph of FIG. 2. The valve does not operate before the pressure from the master cylinder 10 reaches the point $P_1$, viz., it outputs the same hydraulic pressure as that it receives from the master cylinder 10 without altering it at all, which being plotted rectlineally as a. The moment when the hydraulic pressure from the master cylinder 10 exceeds $P_1$ the valve begins to operate for outputting a proportionally, at a certain rate, reduced hydraulic pressure as shown with a line b.

If and when a fluid leakage or the like failure should happen, for example, in circuit I in FIG. 1, the wheel cylinders 11, 12 on the front wheels will not be supplied enough pressure. Even when the circuit II works normally the hydraulic pressure therein is being controlled at a low level so long as the pedal depressing power being more than $P_1$, resulting in delivering insufficient braking power to the rear wheels. It means reducing of the braking power to all of the car wheels, a far lower braking power in comparison with the normal condition. Assuming a failure happening in the circuit II, while the circuit I is normal, the braking pressure to the front wheel cylinders is, without being altered, the same as that produced in the master cylinder 10, as the circuit I has no regulating valve 20. The braking pressure applied exactly corresponds to the pedal depressing power and takes a trend shown with the line a' in FIG. 2. It is of course not desirable from the standpoint of safety driving to deliver the large braking power to the front wheels alone while the rear wheels are supplied with far lower pressure. This invention is aimed, in case a regulating valve being in the non-failure circuit, at ineffectuating of the regulating valve thereby so raising the hydraulic pressure to the wheel cylinders as to attain the line a' on the extension of the line a, which means maintaining of the sufficient necessary braking power.

Figure 3:
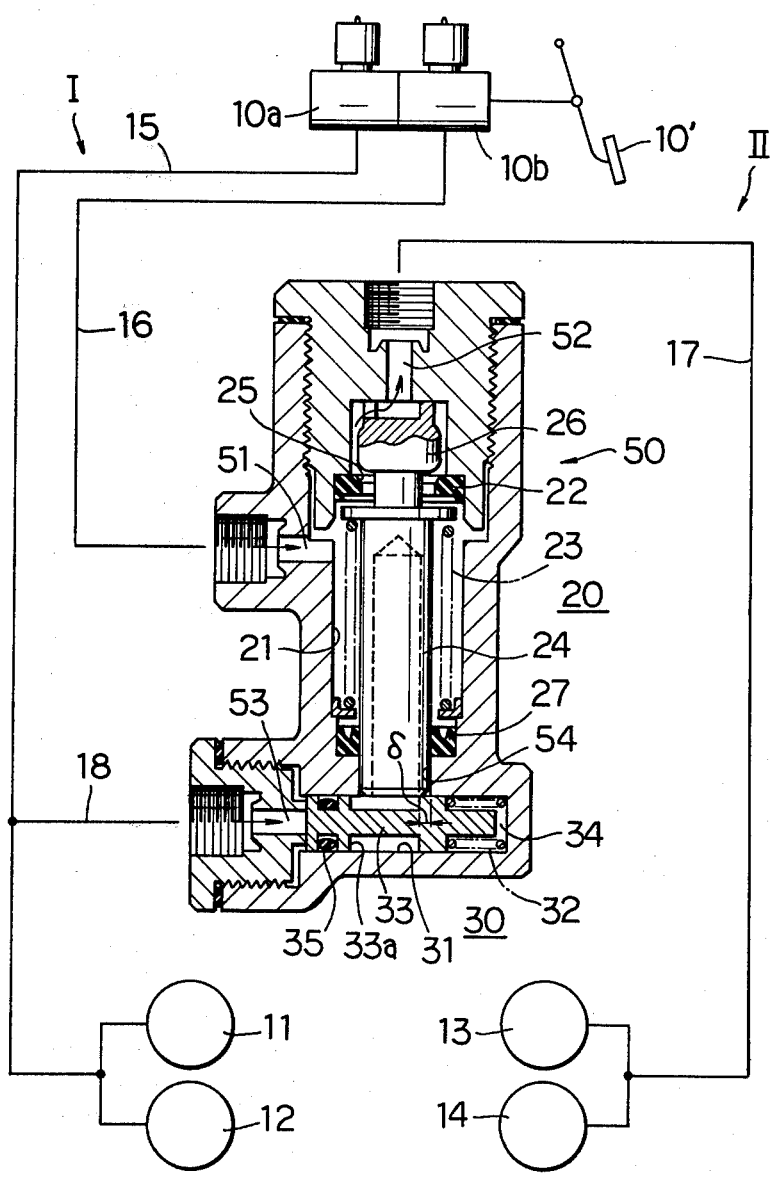
FIG. 3 is a diagram of the dual braking system incorporating an embodiment of this invention, which being shown in its axial cross-section.

In FIG. 3, a dual type braking system of this invention incorporating a proportioning valve as a regulating valve 20 is being shown, wherein a detailed axial cross-section of the valve 20 and an operation restricting mechanism 30 attached thereto are illustrated. In this figure the same signs and numerals are alloted to the greatest possible extent to the corresponding parts or places in FIG. 1. In each of a front master cylinder 10a and a rear master cylinder 10b of the master cylinder 10, tandem arranged, the same amount of master-cylinder-hydraulic-pressure is produced in response to the depressing of a brake pedal 10'. The front master cylinder 10a is, through the piping 15, connected to the front wheel cylinders 11, 12 so as to supply the braking pressure; the rear master cylinder 10b is likewise, through the piping 16, the valve 50, and the piping 17, connected to the rear wheel cylinders 13, 14, so as to supply the braking pressure thereto. The valve 50 is composed of two portions forming a complete unit body together, a proportioning valve portion 20 which disposed between a passage 51 connected to the piping 16 on the side of the rear master cylinder 10b and another passage 52 to the piping 17 on the rear wheel cylinder side, and the operation restricting mechanism 30 for suspending the operation of the proportioning valve 20, the latter 30 is, through a passage 53, connected to a piping 18, which is a branch pipe of the piping 15, thereby being affected by the pressure from the front master cylinder 10a. The proportioning valve 20 is constituted of a cylinder 21, positioned between the passage 51 and the passage 52 in communication with the both, a valve seat 22 disposed in the cylinder 21 facing the passage 52, a first piston 24 mounted in the cylinder 21 and constantly biased upwards (in FIG. 3) by a compressed spring 23 mounted therearound, and a valve body 26 disposed on one end of the first piston 24 for closing a bore 25 in the valve seat 22. The function of this proportioning valve 20 is, as well known, to appropriately vary the rising rate of the hydraulic pressure to the wheel cylinders in response to the balancing relation of the hydraulic pressure acted on the first piston 24 and the elasticity of the spring 23. And the operation restricting mechanism 30, an important element of this invention, is provided with a cylinder 31 disposed substantially perpendicularly to the first piston 24 and a second piston 33 reciprocably inserted in the cylinder 31 biased by a compression spring 32 leftward (in FIG. 3). This second piston 33 is a kind of stepped piston which is provided with a circular recessed portion 33a substantially in the middle portion thereof, i.e., a small-diametered portion, which functions at the same time as an air chamber for the first piston 24. Between the first piston 24 and the second piston 33 is formed a communication bore or passage 54 for allowing the first piston 24 to be slidably fitted therethrough, and the recessed portion 33a of the second piston 33 is so formed as to permit the end portion of the first piston 24 to slidingly fit into. The second piston 33 is faced to an air chamber 34 at its right end, i.e., on the side of the spring 32, and exposed to the hydraulic pressure, at its left end, from the front master cylinder 10a through the passage 53. This piston 33 is usually, when there is no pressure produced in the front and rear master cylinders 10a, 10b, biased leftward by the spring 32, and on the outer periphery thereof (the axial width of the lap portion is δ) the lower end of the first piston 24 is abutted for hindering the fitting of the first piston into the recessed portion 33a. Numerals 27 and 35 respectively designates a sealing ring.

In a normal braking operation the master cylinder hydraulic pressure from the rear master cylinder 10b is, through the piping 16, the passage 51, the proportioning valve 20, the passage 52, and the piping 17, delivered to the rear wheel cylinders 13, 14; and when the wheel cylinder pressure is low in power, the spring 23 in the valve 20 will push up the first piston 24 by its own elasticity, resulting in completely opening the bore 25 in the valve seat 22 by the upward shifting of the valve body 26. It allows the balanced rising of the hydraulic pressure at the master cylinder and the wheel cylinder in a par relation. In the front brake circuit, i.e., the circuit I, the hydraulic pressure from the front master cylinder 10a is, on the other hand, delivered through the piping 15 to the front wheel cylinders 11, 12, when the pressure therein rises at a par relation with that in the front master cylinder 10a. In this situation the operation restricting mechanism 30 in accordance with this invention is, through the branch piping 18 and the passage 53, under the influence of the circuit I pressure, whereby a pressure rising therein beyond a certain value will cause the second piston 33 to be shifted rightward, overcoming the elasticity of the spring 32 by at least the axial width of the lap portion δ, so far as to bring the circular recessed portion 33a coming right beneath the first piston 24 for allowing the same to slidingly down fit thereinto. When the wheel cylinder pressure reaches as high as the $P_1$ point, for example, in FIG. 2, the force or pressure in the valve 20 disposed in circuit II which tends to push down the first piston 24 begins to surpass the set load of the spring 23, by this time the rightward shifting of the second piston 33, which normally blocks the sliding down of the first piston 24 having been finished for allowing, as mentioned above, the fitting of the first piston 24 into the recessed portion 33a. An actual hydraulic control takes place due to the sliding down of the first piston 24 to fit into the recessed portion 33a accompanied by closing of the bore 25 (in the valve seat 22) with the valve body 26 disposed on the first piston 24. While the brake hydraulic pressure is normally delivered, through circuits I and II, to each wheel cylinder to perform the usual braking, the second piston 33 of the operation restricting mechanism 30 is shifted rightwardly in order not to hinder the operation of the proportioning valve 20 for allowing the desired control of the brake hydraulic pressure in circuit II.

And if and when any trouble should happen in circuit I, the front braking circuit, to hinder the pressure rising therein, the operation restricting mechanism 30 begins to show its excellent feature in the hereunder described way. Lessened or extremely fainted pressure in circuit I will apply little action on the second piston 33 to allow it to remain at the extremely left position, due to the biasing force of the spring 32, not shifting rightwardly. The lap portion δ of the second piston 33 serves to block the sliding down of the first piston 24, which suspends the function of the proportioning valve 20, for delivering the pressure from the rear master cylinder 10b as it is, without applying any control on it, to the rear wheel cylinders 13, 14. This means the line a in FIG. 2 is extended along a' to heighten the hydraulic pressure of circuit II for allowing it to produce by itself sufficient braking power desired. What should be drawn attention to herewith is that no fluid in circuit II be employed for blocking the shifting of the first piston 24, and besides the piston 24 can remain at its normal position when the pedal 10' is not depressed. It means that the minimum loss or minimum extra employing of the braking fluid, in this situation, is realized; it can be said a tremendous advantage for the car brake which is operated by only a small entire amount of braking fluid. It is also one of the great merits of this invention to have succeeded in avoiding the shortage of brake stroke or so-called bottoming phenomenon in case of a trouble in circuit I. It is another apparent and innegligible advantage of this invention that the device is extremely simple in construction; and still another advantage is elimination of so-called cup portion wearing (a phenomenon of a partial shaving-off at the sealing member disposed on tip of the piston by the friction when it is forcibly drawn into the communicating passage, between the reservoir and the master cylinder, due to the flowing back of the braking fluid to the reservoir when the pedal is depressed) by means of a suitable adjustment of the spring force which biases the second piston 33. The set load of the spring 32 is to be, of course, lower than the point $P_1$, the master cylinder pressure in FIG. 2.

The above embodiment is only for providing an example for helping a better understanding; various variations or modifications can be practicable without departing from the sprit of this invention.

The spring 32 may, although it is most preferable from the standpoint of constructional convenience to be arranged like in FIG. 2 at the end portion of the second piston 33 where it is exposed to air, be mounted in some different ways; the air chamber 34 may be communicated with the atmosphere ambient; the circular recessed portion 33a may be of any suitable axial width so long as it is larger than the diameter of the first piston 24; and the lap portion δ can be suitably determined on condition that it can sufficiently block the downward shifting of the first piston 24. In addition, this invention is also applicable to other regulating valves such as a limited valve, not being confined to the proportioning valve.

Summing up the characteristic features of this invention, (1) while the brake hydraulic pressure produced by the master cylinder due to the pedal depression is normally, through each circuit, delivered to the wheel cylinders, the control of the brake hydraulic pressure is regularly executed by the first piston in the regulating valve, (2) when the braking pressure is not smoothly delivered to the wheel cylinders, especially when the pressure will not rise over a certain predetermined value due to a trouble in one circuit, irrespective of the ordinary pedal depressing, the operation of the first piston is purposely suspended by the provision of the second piston to sufficiently raise the braking pressure in the remaining circuit beyond the normal condition, and at this time for the action of the second piston on the first piston no braking fluid in circuit II (non-trouble circuit) is employed but only the balancing relation between the pressure in circuit I and the elasticity of the spring is utilized; this means minimization of the fluid loss in the non-troubled circuit, with the result of subsequent effective elimination of brake stroke shortage or so-called bottoming phenomenon. Due to this invention's simple construction various conventional problems concerning, such as, number of component parts, manufacturing labor units, manufacturing precision degree, etc., have all been solved. This device can be said highly reliable as a regulating valve, or as an assembly which is capable of raising the pressure in the remaining circuit with certainty, when a trouble happens in one circuit.

What is claimed is:

1. In a dual hydraulic brake system for automotive vehicles including a master cylinder for generating a brake hydraulic pressure, being related with the depressing degree of the braking pedal, wheel cylinders disposed on each of the front and rear wheels of a vehicle, a pair of mutually independent circuits for connecting said master cylinder and said wheel cylinders, and a regulating valve disposed at least in one of said circuits for controlling the master cylinder brake hydraulic pressure delivered to said wheel cylinders over a certain predetermined level, the improvement comprising, in combination, an operation restricting mechanism including:
a first piston;
a second piston, said second piston being disposed substantially in perpendicular relation to said first piston in said regulating valve for controlling said brake hydraulic pressure, being of stepped configuration having a non-recessed portion on both end portions thereof and a circular recessed portion in the middle portion thereof, said recessed portion functioning as an air chamber for said first piston;
a branch piping branched from a first circuit independent of a second circuit in which said regulating valve is mounted, for directly leading brake hydraulic pressure of said first circuit to one end of said second piston;
an air chamber formed around the other end of said second piston;
a spring engaged with said second piston on the other end thereof in said air chamber formed around the other end of said second piston for biasing said second piston in the opposing direction to the brake hydraulic pressure in said first circuit;
a first cylinder accommodating said second piston for allowing the same to axially reciprocate therein;
a second cylinder; and
a communicating bore portion formed between said first cylinder and said second cylinder, said second cylinder accommodating said first piston for allowing said first piston to slidingly fit therethrough;
whereby the hydraulic pressure in said first circuit, when exceeding a certain predetermined value, causes said second piston to be shifted toward one end, overcoming the spring force of said spring, for allowing an end portion of said first piston to fit into said recessed portion, thereby effectuating the controlling of the brake hydraulic pressure by said regulating valve, and, on the other hand, when being below said certain predetermined value, causes said second piston to be shifted toward the other end by the spring force of said spring to block operation of said first piston due to abutment of the end portion of said first piston onto a peripheral surface of a non-recessed portion of said second piston thereby suspending controlling operation of the brake hydraulic pressure by said regulating valve.

2. An improved hydraulic brake system in accordance with claim 1, wherein said pair of circuits includes circuit means wherein brake hydraulic pressure, being related with the depressing degree of a braking pedal, generated in said master cylinder is delivered from one supplying port thereof directly to said wheel cylinders which are on front wheels, and additional circuit means wherein brake hydraulic pressure from another supplying port of said master cylinder is delivered, after having been controlled by said regulating valve, to said wheel cylinders which are on rear wheels.

3. An improved hydraulic brake system in accordance with claim 1, wherein said regulating valve and said operation restricting mechanism are integrally accommodated in one housing.

4. An improved hydraulic brake system in accordance with claim 1, wherein the spring force of said spring which biases said second piston is smaller than the brake hydraulic pressure at the moment when the controlling of the master cylinder brake pressure in said regulating valve begins to work.

5. An improved hydraulic brake system in accordance with claim 1, wherein said regulating valve is a porportioning valve for regulating the rising rate of said brake hydraulic pressure, which is lead from the master cylinder to the wheel cylinders, so as to reduce it after said brake cylinder hydraulic pressure reached as high as a certain predetermined value.

6. An improved hydraulic brake system in accordance with claim 5, wherein said second cylinder is disposed between a first passage for flowing braking fluid from said master cylinder and a second passage for delivering braking fluid to wheel cylinders, a valve seat mounted in said second cylinder on the side of said second passage, said first piston being reciprocably mounted in said second cylinder with a compression spring disposed thereon, and a valve body disposed on a part of said first piston for closing a bore in said valve seat, whereby the rising rate of brake hydraulic pressure delivered to the wheel cylinders is varied in accordance with the balancing relation between the master cylinder pressure applied on said first piston and the spring force of said spring disposed on said first piston.

7. An improved hydraulic brake system in accordance with claim 1, wherein said master cylinder delivers to said pair of mutually independent circuits the braking hydraulic pressure, which are independent, equal in amount to each other, and variable in response to the depressing degree of said brake pedal.

* * * * *